March 4, 1958 R. F. KREGEL 2,825,899
SERVICE SIGNAL SYSTEM
Filed Oct. 12, 1956
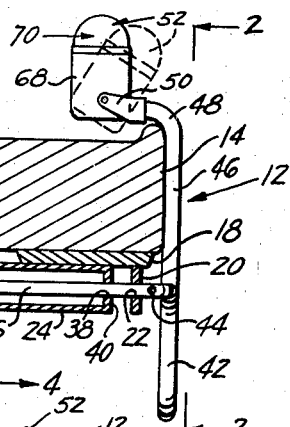
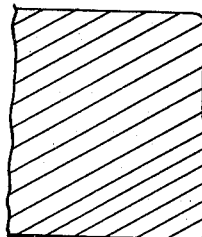
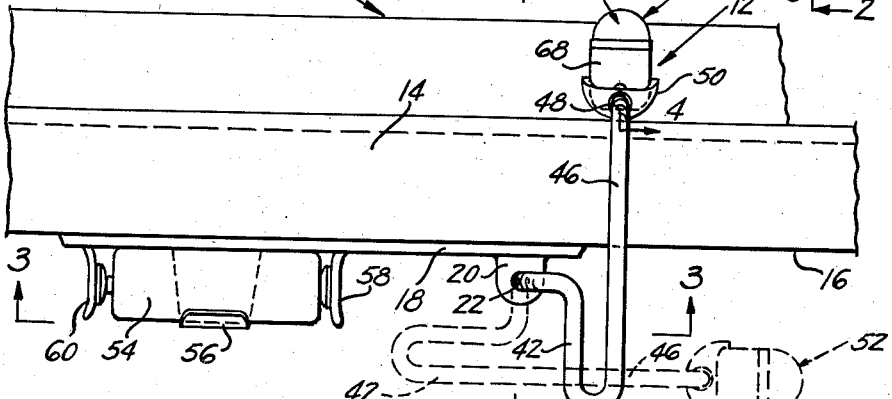
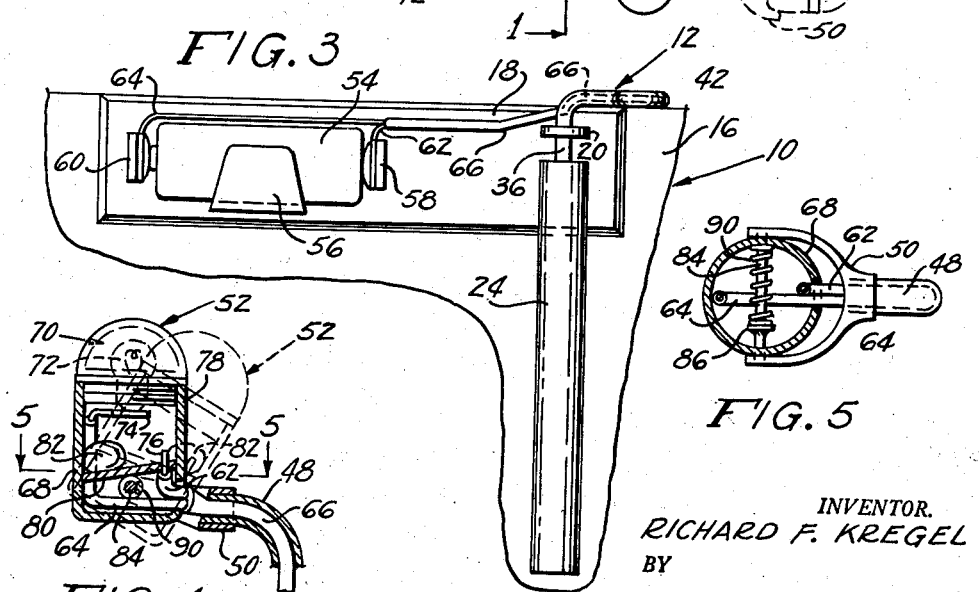
INVENTOR.
RICHARD F. KREGEL
BY
McMorrow, Berman + Davidson
ATTORNEYS

United States Patent Office 2,825,899
Patented Mar. 4, 1958

2,825,899

SERVICE SIGNAL SYSTEM

Richard F. Kregel, Woodland, Calif.

Application October 12, 1956, Serial No. 615,702

3 Claims. (Cl. 340—366)

This invention relates generally to signal systems, and is more particularly concerned with a novel service signal system to be utilized on counters, bars or the like, and the primary object of invention is to facilitate the attracting of an attendant of the bar or counter through the medium of a patron actuated electrically energized signal light assembly.

An important object of the invention in conformance with that set forth resides in the specific details of the signal light assembly which may be disposed in an operative or stored position on an edge portion of a horizontal support member such as a counter or bar, said signal light assembly including means for retaining a signal light in a vertically disposed position adjacent the edge of the support member and incorporating a pivot responsive two-way switch means to be actuated by a patron in a ready and expeditious manner.

A still further object of invention in conformance with that set forth is to provide in a service signal system of the character involved a signal light assembly which is readily and economically manufactured, easily installed and maintained, and highly satisfactory and practical for the purpose intended.

These together with other objects and advantages which will subsequently become apparent reside in the details of construction and operation as more fully hereinafter described and claimed, reference being had to the accompanying drawing forming a part hereof, wherein like numerals refer to like parts throughout, and in which:

Figure 1 is a sectional view, looking substantially from line 1—1 of Figure 2, taken transversely of a counter, bar or the like, portions being broken away and shown in section for clarity;

Figure 2 is an end elevational view looking substantially from line 2—2 of Figure 1, showing by means of dotted lines the position in which the signal light assembly may be disposed in a stored position relative to the bar or counter;

Figure 3 is a bottom plan view looking substantially from line 3—3 of Figure 2;

Figure 4 is an enlarged sectional view taken substantially on line 4—4 of Figure 2, showing by means of dotted lines the alternate position of the signal light when energized for providing a signal; and Figure 5 is a fragmentary sectional view taken substantially on line 5—5 of Figure 4.

Referring to the drawing in detail, a fragmentary portion of a horizontally disposed counter or bar is indicated generally at 10, said bar or counter being defined as a horizontallly disposed support member. Indicated generally at 12 is the signal light assembly of the invention which may comprise permanent installation on the support member 10, or be detachably secured thereto, and it is to be understood that a plurality of such signal light assemblies may be disposed in longitudinally spaced relationship on the inner edge 14 of the support member 10.

Secured on the undersurface 16 of the support member 10 is a suitably secured elongated support plate 18. The support plate 18 is secured adjacent the edge 14 of the support member. Depending from and integral with the support plate 18 is an apertured pivot element or portion 20, the aperture portion 22 thereof defining a horizontal pivot axis as will subsequently become apparent. Suitably secured in transversely extending relationship on the under surface of the support plate 18 is a tubular housing 24 having secured in the apertured end wall 26 thereof one end 28 of a tension spring 30, the other end 32 of which extending through and fixedly secured to the end portion 34 of a support rod 36, an intermediate portion of which extending through an aperture portion 38 of the other end 40 of the tubular housing. The rod 36 continues in an angularly related U-shaped end portion 42, see Figure 2, and is hollow having an aperture portion 44 therein for receiving therethrough a housing for electrical conductors to subsequently be described in detail, providing a satisfactory arrangement for the wiring of the signal assembly. The U-shaped portion 42 continues in an upwardly extending portion 46 which terminates in an arcuate portion 48, see Figure 1, integral with a bifurcated pivot portion 50 supporting a vertically pivotal electrically energized signal light indicated generally at 52. The tension spring 30 urges the portion 46 of the support rod adjacent the one edge 14 of the support member, as clearly seen in Figures 1 and 2, for disposing the signal light 52 in a readily accessible position to a patron or the like to be subsequently actuated by the same for the purpose of signalling an attendant at the bar, for example. When the signal light assembly is not in use is may be pivoted to the dotted line position clearly shown in Figure 2 as indicated by the dotted arrow.

Any suitable source of potential may be utilized for electrically energizing the signal light 52, such as a suitable transformer, for example, however in the preferred embodiment such a medium is disclosed as being a dry cell battery 54 removably retained on the undersurface of the support plate 18 by means of an arcuate resilient clip element 56 engageable with an intermediate portion of the dry cell 54. Opposite ends of the dry cell 54 engage resilient contact elements 58 and 60 depending from the undersurface of the support plate 18. The contacts 58 and 60 are electrically connected to suitable conducting wires 62 and 64, respectively, disposed in a suitable housing 66 which extends through the previously mentioned aperture 44, extending through the tubular support the electrical conductors 62 and 64 terminating within a suitable housing member 68 of the signal light 52, see Figure 4. The casing 68 incorporates a suitable electric light bulb and lens assembly 70 in electrical contact with the casing 68, the light bulb 72, see Figure 4, being engaged at its lower end with the bared end 74 of the electrical conductor 64. The electrical conductor 62 includes a bared end 76 disposed adjacent one side 78 of the housing 68, and extending transversely of the casing 68 in angularly disposed horizontal relationship thereacross is a horizontal support 80 which has disposed on the upper surface thereof a ball of mercury 82 which will extend between the bared end 76 of the electrical conductor 62 and the side wall portion 78 of the casing 68 wherein a circiut will be closed to energize the light bulb 72. Thus observing Figure 4, a signal light 52 is normally disposed in a vertically extending position wherein the ball of mercury 82 is out of engagement with the bared end 76 of the electrical conducter 62, and when the signal light 52 is pivoted on a transversely disposed pivot shaft 84 extending therethrough, the signal light will be actuated. The pivot shaft 84 extends at opposite ends through suitable aligned apertures in the bifurcated support 50, see Figure 5.

A suitable abutment washer 96 is circumposed about an intermediate portion of the shaft 84, see Figure 5, and has in engagement therewith one end of a compression spring 90 circumposed about the shaft 84, the other end of said spring 90 being urged into engagement with the inner surface of the casing 68. The compression spring 90 serves to retain the signal light 52 in either of the positions shown by the solid or dotted lines in Figure 4, thus putting a residual friction against pivotal movement of said signal light.

From the foregoing the use of the novel signal light assembly is believed to be readily apparent and accordingly further description is unnecessary. The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. In a service signal system for counters, bars or the like comprising a horizontal support member, and a signal light assembly comprising a support plate secured on the lower surface of the support member adjacent one edge thereof, said support plate including a depending pivot portion defining a horizontal pivot axis beneath the support member opening toward said one edge thereof, a vertically pivotal support rod pivotally connected to the pivot portion for arcuate movement along the one edge of the support member, the upper end of said rod being positionable above the one edge of the support member, an electrically energized signal light vertically pivoted on the upper end of the support rod for rotation on a horizontal pivot axis, said signal light including two-position pivot-responsive switch means for actuation by an individual desiring service, and a source of potential electrically connected to the signal light and switch means for supplying a current thereto in response to actuation of said switch means by pivoting the signal light.

2. In a service signal system for counters, bars or the like comprising a horizontal support member, and a signal light assembly comprising a support plate secured on the lower surface of the support member adjacent one edge thereof, said support plate including a depending pivot portion defining a horizontal pivot axis beneath the support member opening toward said one edge thereof, a vertically pivotal support rod pivotally connected to the pivot portion for arcuate movement along the one edge of the support member, the upper end of said rod being positionable above the one edge of the support member, an electrically energized signal light vertically pivoted on the upper end of the support rod for rotation on a horizontal pivot axis, said signal light including two-position pivot-responsive switch means for actuation by an individual desiring service, and a source of potential electrically connected to the signal light and switch means for supplying a current thereto in response to actuation of said switch means by pivoting the signal light, said support plate including tension spring means thereon operatively connected to the support rod urging said rod into abutting engagement with the one edge of the support member for optionally retaining the support rod and signal light in a vertical or horizontally disposed position of operative or inoperative positions of use.

3. In a service signal system for counters, bars or the like comprising a horizontal support member, and a signal light assembly comprising a support plate secured on the lower surface of the support member adjacent one edge thereof, said support plate including a depending pivot portion defining a horizontal pivot axis beneath the support member opening toward said one edge thereof, a vertically pivotal support rod pivotally connected to the pivot portion for arcuate movement along the one edge of the support member, the upper end of said rod being positionable above the one edge of the support member, an electrically energized signal light vertically pivoted on the upper end of the support rod for rotation on a horizontal pivot axis, said signal light including two-position pivot-responsive switch means for actuation by an individual desiring service, and a source of potential electrically connected to the signal light and switch means for supplying a current thereto in response to actuation of said switch means by pivoting the signal light, said two-position pivot-responsive switch means comprising a mercury switch including a pair of spaced electrical terminals vertically disposed adjacent a transverse horizontal support, a ball of mercury disposed on the horizontal support for movement thereon into and out of engagement between the spaced terminals for closing or opening a circuit therebetween.

No references cited.